(12) United States Patent
Mashimo

(10) Patent No.: US 9,858,399 B2
(45) Date of Patent: Jan. 2, 2018

(54) GROUP DEFINITION MANAGEMENT SYSTEM

(75) Inventor: Tatsumi Mashimo, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/239,647

(22) PCT Filed: Sep. 27, 2011

(86) PCT No.: PCT/JP2011/072078
§ 371 (c)(1),
(2), (4) Date: Feb. 19, 2014

(87) PCT Pub. No.: WO2013/046336
PCT Pub. Date: Apr. 4, 2013

(65) Prior Publication Data
US 2014/0189796 A1 Jul. 3, 2014

(51) Int. Cl.
*G06F 7/04* (2006.01)
*G06F 21/31* (2013.01)
(Continued)

(52) U.S. Cl.
CPC ............ *G06F 21/31* (2013.01); *G06F 21/305* (2013.01); *G06F 21/604* (2013.01); *H04L 63/08* (2013.01);
(Continued)

(58) Field of Classification Search
CPC ...... G06F 21/31; G06F 21/305; G06F 21/604; H04L 63/08; H04L 63/0823
See application file for complete search history.

(56) References Cited

U.S. PATENT DOCUMENTS

| | | | |
|---|---|---|---|
| 8,256,014 B2 * | 8/2012 | Kori | G06F 21/10 370/469 |
| 8,429,708 B1 * | 4/2013 | Tandon | 726/1 |

(Continued)

FOREIGN PATENT DOCUMENTS

| | | |
|---|---|---|
| JP | 2008217626 A | 9/2008 |
| JP | 2009093580 A | 4/2009 |
| JP | 2009199368 A | 9/2009 |

OTHER PUBLICATIONS

Article entitled "Security Assertion Markup Language (SAML) v 2.0", [online], dated Mar. 15, 2005, OASIS (Organization for the Advancement of Structured Information Standards), [searched on Sep. 8, 2011], Internet <URL: http://www.oasis-open.org/standards#samlv2.0>.

(Continued)

*Primary Examiner* — Techane Gergiso
(74) *Attorney, Agent, or Firm* — Hubbs, Enatsky & Inoue PLLC

(57) ABSTRACT

A group definition management system can easily acquire correspondence between an internal ID and an external ID and easily reflect information of a group definition for the internal ID to an external site. In a typical embodiment of the present invention, this is configured of an internal server 10, an external server 20, and a client. The internal server 10 has an internal user management table 15 and an internal authentication unit 11 that performs authentication by the internal ID. The external server 20 has an external user management table 24 and an external authentication unit 21 that performs authentication by the external ID and replies the information of the external ID in response to an inquiry for whether or not a specific user is an authentic user. The internal server 10 further has an authentication cooperation unit 13 that inquires the external server 20 about whether or not the user is the authentic user of the external server 20 in response to (Continued)

a request from the client used by the user authenticated by the internal authentication unit 11, and registers the replied external ID in the internal user management table 15 so as to correspond to the internal ID.

4 Claims, 3 Drawing Sheets

(51) Int. Cl.
  *G06F 21/30* (2013.01)
  *G06F 21/60* (2013.01)
  *H04L 29/06* (2006.01)
(52) U.S. Cl.
  CPC .. *H04L 63/0823* (2013.01); *G06F 2221/2141* (2013.01)

(56) References Cited

U.S. PATENT DOCUMENTS

| | | | | |
|---|---|---|---|---|
| 2002/0004800 | A1* | 1/2002 | Kikuta | H04L 9/3231 715/255 |
| 2002/0032781 | A1* | 3/2002 | Yoshida | G06F 17/30876 709/228 |
| 2002/0091757 | A1* | 7/2002 | Cuomo | H04L 63/0281 709/203 |
| 2003/0120948 | A1* | 6/2003 | Schmidt et al. | 713/200 |
| 2003/0177388 | A1* | 9/2003 | Botz et al. | 713/201 |
| 2003/0188156 | A1* | 10/2003 | Yasala | H04L 63/0823 713/156 |
| 2004/0187009 | A1* | 9/2004 | Ebata | G06F 21/32 713/185 |
| 2005/0044225 | A1* | 2/2005 | Ota | H04L 29/06 709/225 |
| 2005/0188225 | A1* | 8/2005 | Ikenoya | H04L 63/0807 726/5 |
| 2005/0223217 | A1* | 10/2005 | Howard | G06F 21/31 713/155 |
| 2006/0020783 | A1* | 1/2006 | Fisher | G06Q 20/02 713/156 |
| 2006/0117378 | A1* | 6/2006 | Tam | G06F 21/10 726/3 |
| 2007/0089167 | A1* | 4/2007 | Villavicencio | H04L 63/08 726/5 |
| 2009/0025072 | A1* | 1/2009 | Kondo | G06F 21/608 726/7 |
| 2009/0055904 | A1* | 2/2009 | Gomi | H04L 63/08 726/4 |
| 2009/0070863 | A1* | 3/2009 | Shimizu | H04L 63/0236 726/7 |
| 2009/0077642 | A1* | 3/2009 | Eom | H04L 63/164 726/6 |
| 2009/0100261 | A1* | 4/2009 | Aoshima | H04L 63/20 713/155 |
| 2009/0119506 | A1* | 5/2009 | Allen | H04L 9/08 713/156 |
| 2009/0150968 | A1* | 6/2009 | Ozzie | H04L 63/08 726/1 |
| 2009/0180141 | A1* | 7/2009 | Takaishi | G03G 15/5075 358/1.15 |
| 2010/0017334 | A1* | 1/2010 | Itoi | G06Q 20/02 705/71 |
| 2010/0037301 | A1 | 2/2010 | Jones | |
| 2010/0138430 | A1* | 6/2010 | Gotou | G06F 21/6218 707/754 |
| 2010/0138899 | A1* | 6/2010 | Yamamoto | G06F 21/31 726/3 |
| 2010/0186083 | A1* | 7/2010 | Shinzaki | G06F 21/32 726/19 |
| 2010/0214600 | A1* | 8/2010 | Yagi | G06F 21/34 358/1.15 |
| 2010/0251341 | A1* | 9/2010 | Kijima | 726/4 |
| 2010/0281520 | A1* | 11/2010 | Deguchi | G06F 21/31 726/3 |
| 2010/0306843 | A1* | 12/2010 | Okada | H04L 9/32 726/21 |
| 2011/0041166 | A1* | 2/2011 | Mani | G06F 21/31 726/6 |
| 2011/0066653 | A1* | 3/2011 | Uruma | G06F 21/552 707/783 |
| 2011/0231443 | A1* | 9/2011 | Hannel et al. | 707/776 |
| 2012/0066387 | A1* | 3/2012 | Park | H04N 21/25825 709/225 |
| 2012/0084364 | A1* | 4/2012 | Sivavakeesar | H04L 12/1818 709/205 |
| 2012/0189000 | A1* | 7/2012 | Rahman | H04L 63/08 370/352 |
| 2014/0047083 | A1* | 2/2014 | Ichikawa et al. | 709/220 |

OTHER PUBLICATIONS

International Search Report for PCT Serial No. PCT/JP2011/072078 dated Oct. 25, 2011.

* cited by examiner

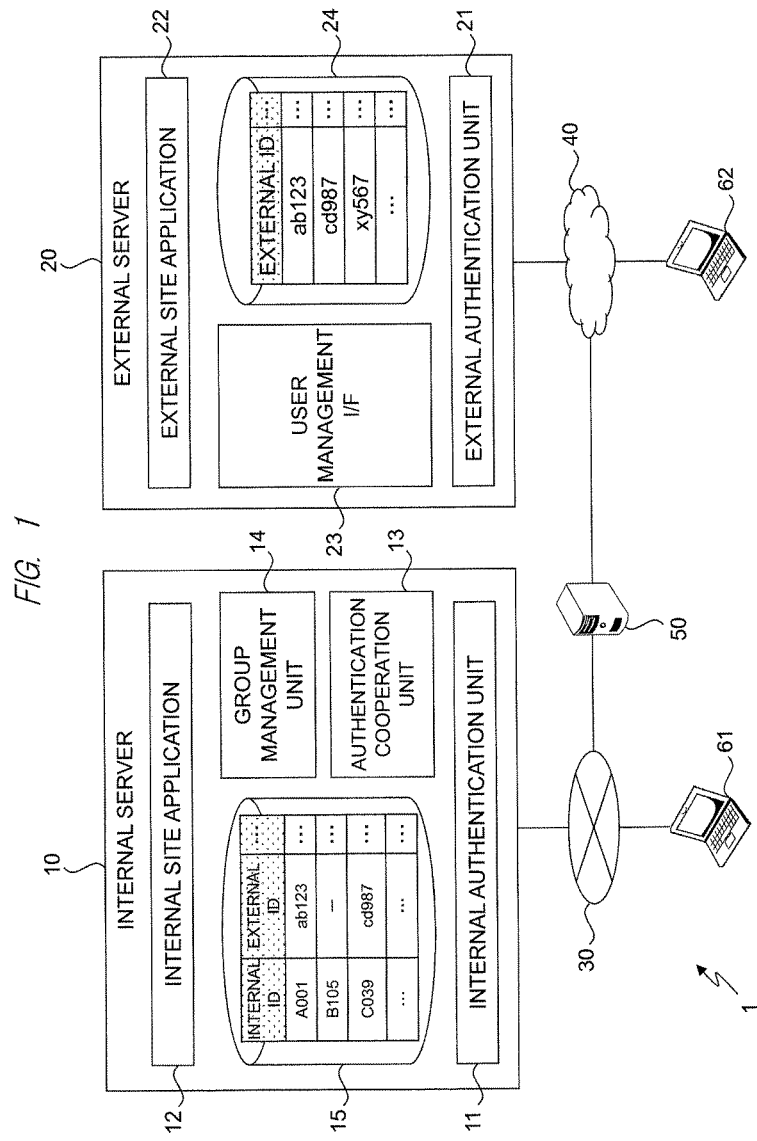

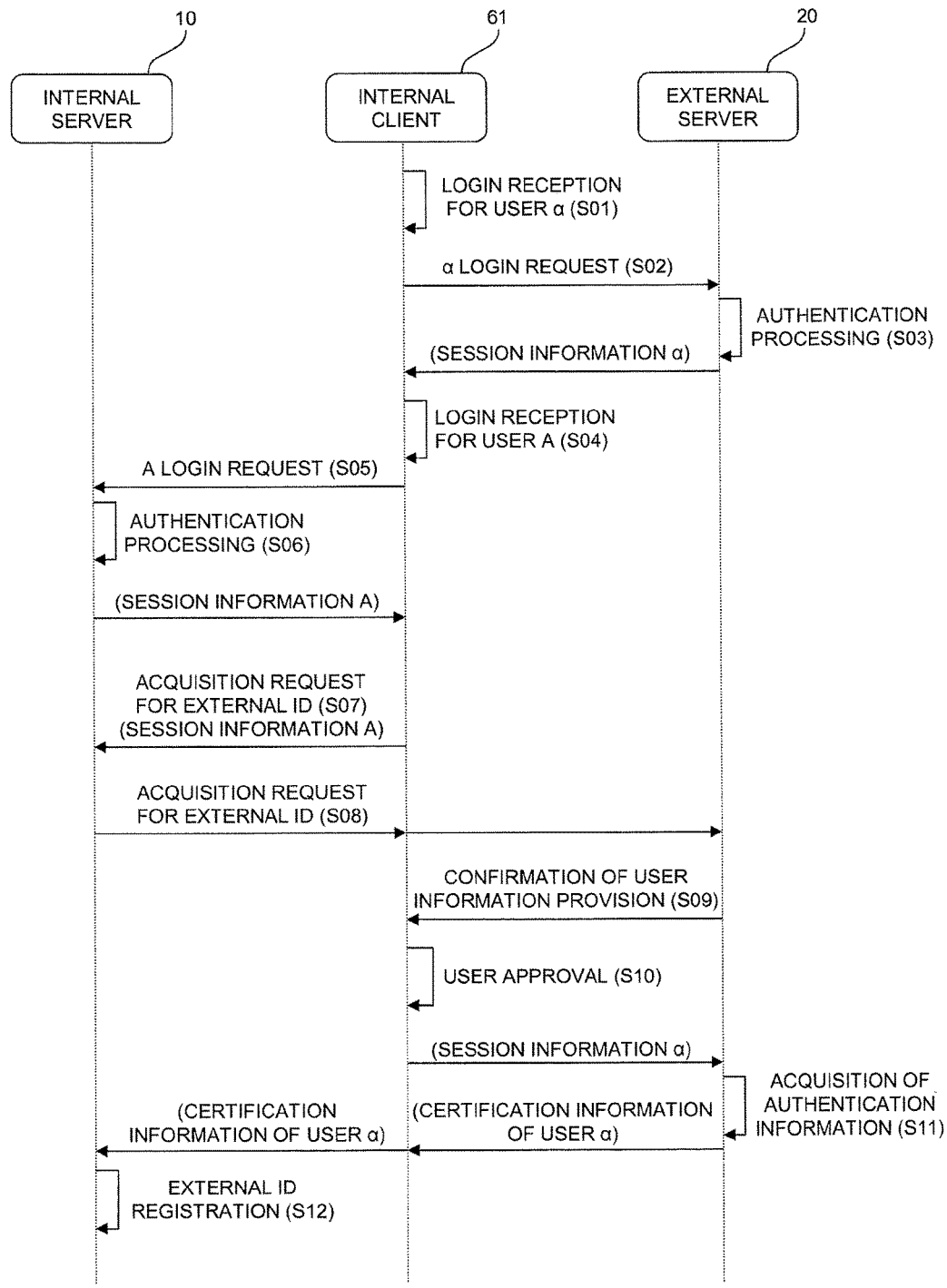

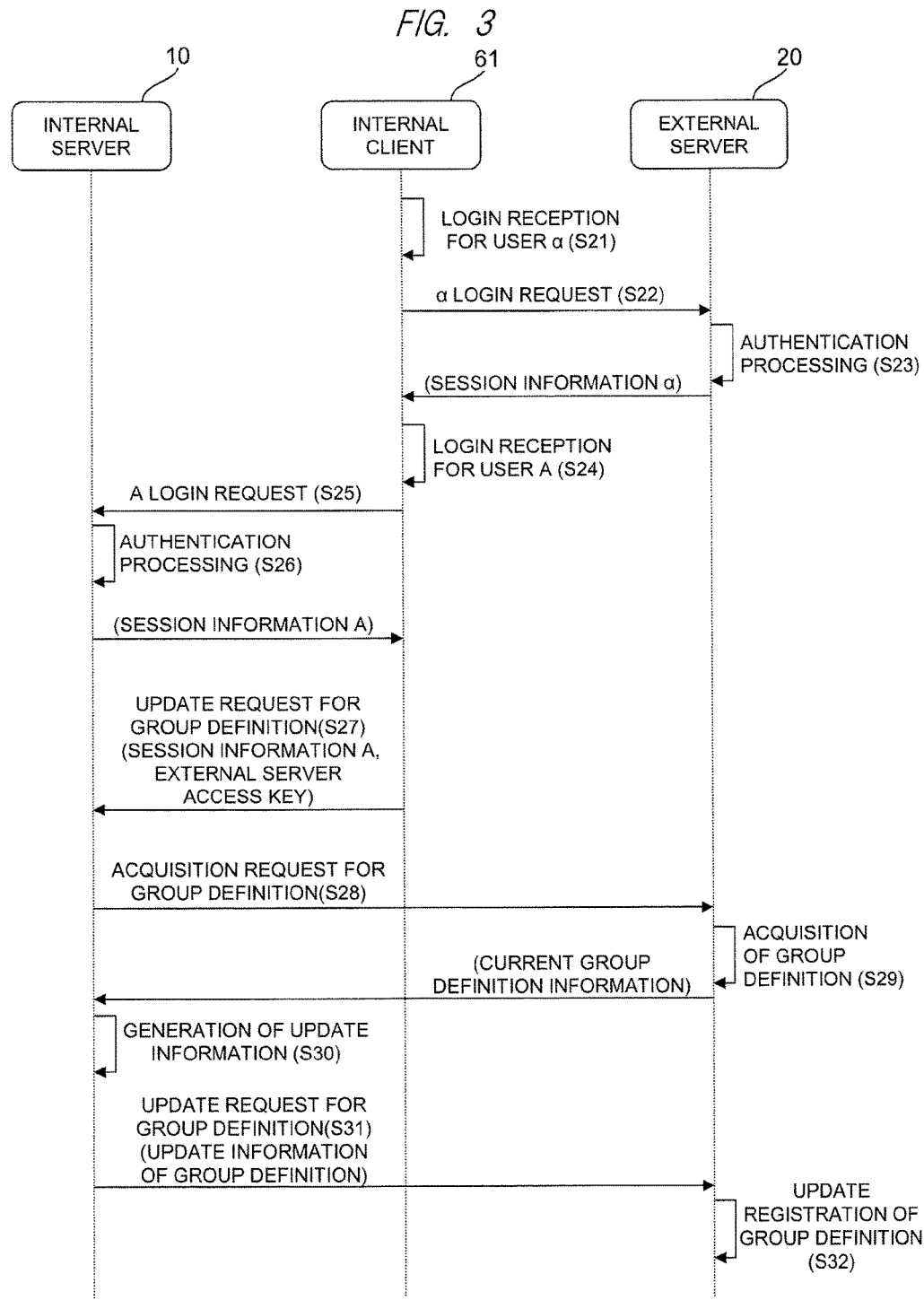

GROUP DEFINITION MANAGEMENT SYSTEM

CROSS REFERENCE TO RELATED APPLICATIONS

This application is entitled to the benefit of and incorporates by reference subject matter disclosed in International Patent Application No. PCT/JP2011/072078 filed on Sep. 27, 2011.

TECHNICAL FIELD

The present invention relates to a cooperation technique between websites, and, more particularly, the present invention relates to a technique effectively applied to a group definition management system in which information of members in a user group is cooperated between an internal site such as an in-house system of a company and an external site such as a SNS service.

BACKGROUND ART

In recent years, usage of service that is so-called SNS (Social Networking service) represented by Facebook (registered mark), Twitter (registered mark) and others has been globally expanded, and the services have been widely recognized as effective tools for communication means. Accordingly, it is considered that, for example, these services are used for not only an individual but also utilization as a communication tool for a company or others within and outside the company.

Here, so-called Single Sign-On (SSO) technique is cited as a system used in such a situation that an employee of the company or others uses both of the in-house system of the company and the external SNS service. In the SSO, a plurality of systems or servers for which the user authentication is required can be accessed by performing authentication (for example, authentication on the in-house system of the company) once without individually performing an authentication procedure. As a method of achieving this system, a method not requiring the authentication procedure on each server or others by the user again is taken, the method being achieved by, for example, performing communication between the servers using SAML (Security Assertion Markup Language) protocol (described in Non-Patent Document 1) and automatically passing information of an authentication result performed on a certain server while protecting privacy.

Also, for example, Japanese Patent Application Laid-Open Publication No. 2009-93580 (Patent Document 1) describes a user authentication system provided with: a creating unit which creates an appropriate authentication code string and transmits the authentication code string to a client when a request for access from the client to a user authentication device is received; and a determining unit which compares a response code string created by a second server with a response code string created by a first server and determines whether or not the access to the user authentication device is permitted for the client, and describes that the second server does not have or not need to have a user ID for the first server which is a counterpart sharing log-in information, that is, there is no information, except for information provided from the server, specifying whom on the first server a user on the second server is, so that the service is provided to a user whose identity is certified to some extent without requiring the registration of individual information by which the individual can be specified to some extent.

SUMMARY

When the external SNS service is used as the communication tool for the employee, it is desired that the communication is limited within a community or a group in which only relevant parties of the employee or others can participate, in a viewpoint of information leak or others. Regarding this viewpoint, in the authentication system by using the SSO as described above, although the external SNS service can be used without requiring the log-in processing again by, for example, logging in to the in-house system of the company, the community or the group in which only relevant parties of the employee or others can participate cannot be formed in the SNS service. Also, for example, when the employee desires to use the SNS service on his/her home or others out of business hours, the employee basically cannot access the in-house system of the company, and therefore, the employee originally cannot use the SSO system itself to/from the in-house system of the company.

Generally, in the in-house system of the company or others, registration/deletion of the user ID of the employee, definition of the group, and others is managed in cooperation with human-resource information such as resining/retirement/layoff/firing and personnel rotation. Accordingly, also in the external SNS service, it is considered that the community or the group is formed with usage of/reference to the user information (information related to the group of the user such as a department) managed on the in-house system of the company. However, the cooperation of the user information inside the company with the external SNS service (service whose management or others cannot be controlled by the company) in such a mode puts a large load on infrastructure construction.

Accordingly, in the external SNS service, it is considered that an administrator or others follows a usual operational procedure and directly forms the community or the group in which only the employee can participate. In this case, it is not required to construct the infrastructure for providing the cooperation of the user information of the in-house system of the company with the SNS service. However, in this case, when the user information has been added/changed in accordance with the personnel rotation of the employee or others, the workload of the administrator or others is large so as to require such maintenance that the addition/change is reflected to the user information in the SNS service for every addition/change by the administrator or others, and besides, there is a possibility of the failure of the reflection.

Also, in this case, the administrator or others can define the group for the user ID in the external SNS service based on the information of the group definition for the user ID in the company by recognizing correspondence between a user ID of each employee in the company and a user ID of the employee in the SNS service. At this time, for example, efficiency of a method is extremely poor, the method of corresponding the user ID in the company to the user ID of each employee in the external SNS service inquired and acquired by the administrator or others.

On the other hand, for example, another method is also concerned, the method in which each employee individually notifies of and registers the information of the user ID used in the SNS service so that the correspondence of the user ID to the user ID in the company is recognized. However, correct information of the user ID used in the SNS service cannot be acquired due to the failure of the notification, the false notification, and others.

Accordingly, a preferred aim of the present invention is to provide a group definition management system capable of easily acquiring correspondence between a user ID in an internal site such as an in-house system of a company and a user ID in an SNS service or others of an external site and easily reflecting information of group definition of the user ID in the internal site in information of group definition of the user ID which forms community or others in the SNS service of the external site. The above and other preferred aims and novel characteristics of the present invention will be apparent from the description of the present specification and the accompanying drawings.

The typical summary of the inventions disclosed in the present application will be briefly described as follows.

A group definition management system according to a typical embodiment of the present invention is a group definition management system configured of: a first server and a second server connected to a network; and a client who is connectable to both of the first server and the second server, and has the following characteristics.

That is, the first server has: a first user management table that stores information of a first ID for each user who can use the first server and information related to group definition of each user; and a first authentication unit that authenticates a user by the first ID in response to a request from the user via the client, the second server has: a second user management table that stores information of a second ID for each user who can use the second server and information related to group definition of each user; and a second authentication unit having an authentication interface that authenticates the user by the second ID in response to a request from the user via the client, and that replies the information of the second ID for the user acquired from the second user management table in response to an inquiry as to whether a specified user is an authentic user of the second server or not and if the user is the authentic user.

Also, the first server further has an authentication cooperation unit that inquires the second server as to whether the user is the authentic user of the second server or not in response to a request from the client used by the user authenticated by the first authentication unit, and that registers the second ID for the user replied from the second server in the user management table so as to correspond to the first ID for the user.

The effects obtained by typical aspects of the present invention disclosed in the present application will be briefly described below.

According to the typical embodiment of the present invention, correspondence between a user ID in an internal site such as an in-house system of a company and a user ID in an SNS service or others of an external site can be easily acquired. Moreover, information of group definition of the user ID in the internal site can be easily reflected to information of group definition which forms a community or a group in the SNS service or others of the external site. In these manners, only a specified user in the internal site such as an employee can participate as a member in the SNS service or others of the external site, so that the community or the group where in-house communication of the company can be performed can be easily formed.

BRIEF DESCRIPTIONS OF THE DRAWINGS

FIG. 1 is a diagram illustrating a summary of a configuration example of a group definition management system according to an embodiment of the present invention;

FIG. 2 is a diagram illustrating a summary regarding a processing flow example in a case in which an internal server acquires information of an external ID of a corresponding user from an external server and registers the external ID in the embodiment of the present invention; and FIG. 3 is a diagram illustrating a summary of a processing flow example in a case in which group definition of the external ID in the external server is updated based on information of group definition of the internal ID in the internal server in the embodiment of the present invention.

BEST MODE FOR CARRYING OUT THE INVENTION

Hereinafter, an embodiment of the present invention will be described in detail with reference to the accompanying drawings. Note that the same components are denoted by the same reference symbols in principle throughout all drawings for describing the embodiment, and the repetitive description thereof will be omitted.

A group definition management system according to an embodiment of the present invention is a system for supporting formation of a community or a group in which only an employee or others in a specified group in an external SNS service or others can participate because the external SNS service or others can be utilized for in-house communication of the company.

In the present embodiment, the correspondence relation between the user ID of each user (such as an employee) of an internal site such as an in-house system of a company (which is a user ID in the internal site and will be sometimes referred to as "internal ID" below) and a user ID used by each user in an external site such as an SNS service (which is a user ID in the external site and will be sometimes referred to as "external ID" below) can be easily acquired.

This manner supports the administrator of the internal site or others to form a closed community or group in the external site such as an SNS service (including a site which cannot be basically controlled in management and operation by a company of the internal site or others) in which only a corresponding user (employee) can participate based on the group definition of the user (employee) based on a department, a project, or others in the company or others, and to perform maintenance of information of members included in the community or group. If the external site has a command and an external interface such as API (Application Programming Interface) related to the operation of the group definition of the user, processing of the group definition in the external site can be automatically performed by using them.

For each user such as the employee, the internal site acquires the information of the corresponding external ID from the external site. Here, the external site has an authentication API as the external interface, and the internal site uses this to acquire the information of the external ID. The authentication API described here does not perform the authentication processing with specification of a user ID and a password, but replies information indicating whether the objective user is the authentic user in the site (external site) or not, and a content of this response contains the information of the external ID of the objective user. The authentication API is a generally-provided interface although a detailed mounting method is different in an SNS service or others which is expected to operate while cooperating authentication information with a different Web site.

Normally, the authentication API is used for achieving so-called SSO in cooperation between Web sites. For example, the authentication API is used in a case in which an authentication system in a certain Web site A (for example, a (social) interaction game site) uses the authentication API owned by a different Web site B (for example, an affiliated SNS site), and permits usage if it can be confirmed that the objective user has some sort of authority in the different Web site B. Note that the usage described here aims at not the usage in the Web site B but the usage in the Web site A is a target.

Therefore, a form of the usage of the conventional authentication API is usage for acquiring the authentication information in the Web site B in a state in which the user will log in to the Web site A from now. On the other hand, as described later, the present embodiment is different in that the authentication API is used for further acquiring the authentication information (containing the information of the external ID logged in to the external site) from the external site in a state in which the user has already logged in to both of the internal site and the external site has already been carried out, the authentication API is used.

<System Configuration>

FIG. 1 is a diagram illustrating an outline of a configuration example of a group definition management system according to an embodiment of the present invention. The group definition management system 1 has, for example, a configuration in which an internal server 10 serving as a server system configuring the internal site such as the in-house system of the company is connected to an internal network 30 such as an in-house LAN (Local Area Network) and a configuration in which an external server 20 serving as a server system configuring the external site serving as the SNS service such as Facebook is connected to an external network 40 such as the Internet.

An internal client 61 which is an information processing terminal such as a PC (Personal Computer) used by a user such as an employee on his/her job is connected to the internal network 30, and an external client 62 serving as a PC or others used by an employee or others at his/her home as an individual is connected to the external network 40. Note that it is assumed that the internal network 30 is accessible from the internal client 61, and besides, that the external network 40 is accessible via a gateway server 50 or others. Also, only the external network 40 is basically accessible from the external client 62. However, it may be configured that the internal network 30 is accessible via a gateway server 50 therefrom by using, for example, VPN (Virtual Private Network) or others.

The internal server 10 is a server system configuring the internal site such as the in-house system of the company, and has units such as an internal authentication unit 11, an internal site application 12, an authentication cooperation unit 13, and a group management unit 14, which are, for example, mounted as software programs operating on a middleware such as an OS (Operating System) and a Web server program not illustrated. Moreover, the internal server 10 has an internal user management table 15 configured of a database or others.

The internal user management table 15 stores user information as to a user such as an employee who can access the internal server (internal site) 10 and use a service (an in-house system of the company) served by the internal site application 12. The user information contains, for example, not only the user ID (internal ID), the password, and others, but also the information of the group definition which is the information of the department or the project to which the user belongs, and the group or the community such as in-house activities.

The internal authentication unit 11 performs a processing as to the login authentication in the access of the user such as the employee to the internal server (internal site) 10 via the internal client 61 (or the external client 62). At this time, the internal user management table 15 is referenced in order to obtain the user information such as the internal ID and the password.

The internal site application 12 is an application program which performs a processing as to a service provided by the internal site. For example, the internal site application 12 is implemented as a Web application which operates on a non-illustrated Web server program, and the user can use the service provided by the internal site application 12 by using a non-illustrated Web browser on the internal client 61 (or the external client 62).

The authentication cooperation unit 13 cooperates with the external server (external site) 20 by using the above-described authentication API as to the authentication information for the user who has logged in via the internal authentication unit 11 so as to acquire the information as to the user ID (external ID) of the user in the external server 20. The acquired external-ID information is registered in the internal user management table 15 so as to correspond to the internal-ID information of the user. That is, as the user information, the internal user management table 15 also stores the correspondence relation between the internal ID used in the in-house system of the company and the external ID used in usage of the external SNS service for the user such as the employee.

Note that, while each of all of the users such as the employees basically has the internal ID, the external ID is not provided depending on the user because the user does not use the external SNS service or the external ID is not used for the in-house communication of the company but for only personally use, and therefore, the external ID is not registered in some cases. Also, it is assumed that, for the user who has a plurality of user IDs in the external SNS service, only (or the plurality of) the external ID(s) used for the in-house communication of the company is (are) registered.

Based on the information of the group definition of the internal ID in the internal user management table 15, the group management unit 14 outputs the maintenance information (instruction information of new addition, delete, change, and others of a group) as to the group definition of the corresponding external ID. Based on the maintenance information, for example, the administrator or others can perform the maintenance processing related to the group definition such as new addition, delete, and change of the community and the group with respect to the external server 20 and new addition, delete, and change of the external ID with respect to these community and group. Note that, if the external server 20 has a command, an external interface such as API, and others for the maintenance of the user information, the maintenance processing as to the group definition of the external ID in the external server 20 can be automatically performed by using them based on the maintenance information.

The external server 20 is a server system configuring the external site such as the SNS service, and has units as similar to the internal server 10, such as an external authentication unit 21, an external site application 22, and a user management interface (I/F) 23, which are, for example, implemented as software programs operating on a middleware such as a non-illustrated OS and Web server program. Moreover, the external server 20 has an external user management table 24 configured of a database or others. The external user management table 24 stores user information containing the external ID and the password as to the user who can access the external server (external site) 20 and use the SNS service served by the external site application 22.

The external authentication unit 21 performs a processing as to the login authentication when the user such as the employee accesses the external server (external site) 20 via the external client 62 or the internal client 61 and use the SNS service. At this time, the external user management table 24 is referenced in order to obtain the user information such as the external ID and the password. The external authentication unit 21 has the above-described authentication API as the external interface such as the API.

The external site application 22 is an application program which performs a processing as to the SNS service served by the external site. For example, the external site application 22 is implemented as the Web application which operates on the non-illustrated Web server program, and the user uses the SNS service served by the external site application 22 by using a non-illustrated Web browser on the internal client 61 or the external client 62. Note that, although it is set that the service served by the external site is the SNS service in the present embodiment, the service is not limited thereto. Any service can be applied as long as a service is used by many users other than the employee or others and forms the group or others for each of the users.

The user management interface (I/F) 23 is an opened external interface such as a command and API for managing (referencing, registering, deleting, changing, etc.) the user information containing the user ID which is registered and managed in the external user management table 24 and the information of the group definition of the group, the community, or others in the SNS service. The interface may be, for example, usable after a certain user such as the administrator logs in or directly accessible by using a key, a password, or others without intermediation of the user. Note that, depending on the external server 20, there is such a case that the external server 20 does not have such an interface which is usable from a program, a script, or others and has only an interface to be manually operated by a Web browser or others. However, even such an external server 20 can be applied.

<Processing Flow (Acquisition of External ID Information)>

The following is explanation as to a processing, by the internal server 10, of acquiring the information of the external ID of a certain user used in the external server 20 for the in-house communication of the company from the external server 20 and registering the external ID in the internal user management table 15 so as to correspond to the internal ID.

FIG. 2 is a diagram illustrating outline of an example of a processing flow in the acquisition and the registration of the external ID of the corresponding user from the external server 20 by the internal server 10. First, the internal client 61 (or the external client 62) receives a login request for specifying the external ID (in the example of FIG. 2, a user "α") for the external server 20 from the user such as the employee via the Web browser (S01), and transmits the login request of the user "α" to the external server 20 (S02). In the external server 20 which has received the login request, the authentication processing is performed by referencing the external user management table 24 by the external authentication unit 21 (S03), and session information of this session of the user "α" is generated by the Web server program, and is replied to the internal client 61 together with an authentication result.

Furthermore, the internal client 61 (or the external client 62) similarly receives a login request for specifying the internal ID (in the example of FIG. 2, a user "A") for the internal server 10 from the user such as the employee via the Web browser (S04), and transmits the login request of the user "A" to the internal server 10 (S05). In the internal server 10 which has received the login request, the authentication processing is performed by referencing the internal user management table 15 by the internal authentication unit 11 (S06), and session information of this session of the user "A" is generated by the Web server program, and is replied to the internal client 61 together with an authentication result.

In the subsequent processing, when the internal client 61 accesses the internal server 10 (as similar to access to the external server 20), it is assumed that this access is made by the user who has been authenticated as the user "A" by showing the session information "A", but the access is not limited to the assumption. For example, the internal client 61 may employ a method in which the internal ID and the password are showed to the internal server 10 for every access, or in which the authentication is performed by a public key (for example, a client certification or others).

Then, automatically or based on an instruction from the user, the internal client 61 transmits an acquisition request for the external ID in the external server 20 to the internal server 10 (S07). In the internal server 10 which has received the acquisition request for the external ID, an acquisition request for the external ID (execution request for the authentication API) is transmitted to the external server 20 by the authentication cooperation unit 13 in a state in which the user who is accessing can be confirmed to be the user "A" from the information (for example, the session information "A" or others) in accordance with the access (S08).

Here, as similar to a method of the authentication cooperation in a conventional technique described in, for example, Patent Document 1, Non-Patent Document 1, and others, the authentication cooperation unit 13 generates the acquisition request for the external ID as a challenge of a challenge-and-response method based on, for example, information such as a key previously shared between the internal server 10 and the external server 20. The generated acquisition request is indirectly transmitted to the external server 20 by, for example, redirect by the Web browser on the internal client 61.

In the external server 20 which has received the acquisition request for the external ID, the authentication API for confirming whether the objective user is the authentic user on the external server 20 or not is issued by the external authentication unit 21. At this time, if the objective user has already logged in to the external server 20, the external server 20 can technically return a reply to the internal server 10 based on the information (such as the session information "α" or others) in accordance with the access without making any inquiry to the user. However, if the user has not logged in to the external server 20, for example, the external server may encourage the user to log in or may inform the user of a fact that "an inquiry has been issued from the internal site" and confirm whether or not transmission of the information related to authority of the user on the external server 20 to the internal server 10 is approved.

In the present embodiment, since the external server 20 has obtained the information (for example, the session information "α") of the objective user in this access, it has been recognized that this user is the user "α". Therefore, for example, for the inquiry from the internal server 10, the user may be inquired of whether or not provision of the information related to the external ID (user "α") is approved (S09) via display on the Web browser, and the approval may be obtained (S10).

The external authentication unit 21 of the external server 20 which has received the information of the session information "α" acquires the authentication information containing the information of the corresponding external ID (user "α") based on the session information "α" (S11), and transmits the certification information indicating that the external ID of the user corresponding to the session information "α" is the user "α", to the internal server 10. Also, here, the certification information indicating that it is the user "α" is indirectly transmitted to the internal server 10 by, for example, redirect by the Web browser on the internal client 61.

Note that more detailed information may be received/transmitted between the internal server 10 and the external server 20 by direct communication therebetween, or it may be confirmed from the external server 20 whether or not the internal server 10 is set so as to be permitted for the reception/transmission of the information. In this manner, even a case in which, for example, limitation of the external server 20 is provided so as to reply only to a server which has been previously registered can be supported.

In the internal server 10 which has received the certification information indicating that the external ID is the user "α", the information of the acquired external ID is registered in the internal user management table 15 by the authentication cooperation unit 13 so as to correspond to the information of the internal ID (S12). In this manner, in the internal user management table 15, the correspondence relation between the internal user ID (user "A") used on his/her job and the external ID (user "α") can be recognized. Note that only the user (employee) who desires to participate in the community or others where the in-house communication of the company is performed may perform the above-described series of processing in the SNS service of the external site or others.

Note that the above-described example is performed in an order of the login of the user to the external server (external site) 20 first (steps S01 to S03), and then, the login thereof to the internal server (internal site) 10 (steps S04 to S06). However, the order of the login to each server (site) may be reversed. Moreover, the login to the external server 20 may have not been performed (the processing corresponding to steps S01 to S03 may have not been performed) before the internal client 61 transmits the acquisition request for the external ID to the internal server 10 in step S07. At this time, for example, instead of the processing from steps S09 to S10, the login processing to the external server 20 (the processing corresponding to steps S01 to S03) may be requested to the internal client 61 to be performed.

Also, there are various methods for the inquiry for the external ID to the external server 20 from the authentication cooperation unit 13 of the internal server 10, and they can be appropriately used. For example, the authentication API is provided by the external server 20 for the cooperation of the authentication information as the example described above, and not only the method of the usage of the authentication API from the internal server 10 but also a method of acquiring the external ID in the simple login to the external server 20 via the authentication cooperation unit 13 of the internal server 10 by using the system of the SSO can be also employed.

<Processing Flow (Maintenance of Group Definition Information)>

The following is explanation of the processing in automatic reflection of the information of the group definition of the internal ID to the group definition of the external ID in the external server 20 by recognizing the correspondence relation between the internal ID and the external ID by the above-described processing illustrated in FIG. 2 by the internal server 10, and then, maintaining the group definition of the external ID in the external server (external site) 20 (for the formation of the group or the community) based on the update information of the group definition of the internal ID (for the new addition, the deleting, the change, and others) based on the human-resource information of the employee on the internal server (internal site) 10 side or others.

FIG. 3 is a diagram illustrating outline of an example of the processing flow in the update of the group definition of the external ID in the external server 20 based on the information of the group definition of the internal ID in the internal server 10. First, as similar to the processing of steps S01 to S06 of the processing illustrated in FIG. 2, the internal client 61 (or the external client 62) receives the login request from the user such as the employee via the Web browser, performs the login processing to both of the external server 20 and the internal server 10, and acquires the session information ("α" and "A") (S21 to S26). Note that the user described here is a user who has management authority for the group definition (the formation of the group or the community) of the user in the external server 20.

Then, automatically or based on the instruction from the user, to the internal server 10, the internal client 61 transmits the update request for the group definition in the external server 20 together with the key, etc. for the access to the external server 20 based on the session information "A" and the session information "α" (S27). In the internal server 10 which has received the update request for the group definition, the session information "A" is confirmed, and then, an acquisition request for a current group definition is transmitted to the external server 20 by the group management unit 14 (S28).

Here, the group management unit 14 performs the acquisition request for the group definition by, for example, directly invoking the user management I/F 23 of the external server 20. Note that such another method that the request is indirectly transmitted to the external server 20 by, for example, a processing for the data reception/transmission by automatically switching a screen via the Web browser on the internal client 61 can be also employed. In the external server 20 which has received the acquisition request for the group definition of the external ID, the current group definition of the external ID is acquired by the user management I/F 23 from the external user management table 24 (S29), and is transmitted to the internal server 10.

In the internal server 10 which has received the current group definition information of the external ID, the update information of the group definition of the external ID (the information related to the new addition, the deleting, the change, and others for the group, the community, or the member of this) is generated by the group management unit 14 from a difference based on comparison between the current group definition information of the external ID and the group definition information of the internal user management table 15 (S30).

Then, the group management unit 14 of the internal server 10 transmits the update request for the group definition to the external server 20 together with the update information of the group definition (S31). Also here, as similar to the above description, the update request for the group definition is performed by, for example, directly invoking the user management I/F 23 of the external server 20. Note that such another method that, for example, the request is indirectly transmitted to the external server 20 by a processing of the data reception/transmission or others by automatically switching a screen via the Web browser on the internal client 61 can be also employed.

In the external server 20 which has received the update request for the group definition of the external ID, the update of the group definition is registered in the external user management table 24 by the user management I/F 23 based on the update information of the group definition (S32). By the above-described processing, when the user who has the management authority logs in, it can be checked whether the current group definition of the group or the community which is a management target in the external server 20 is in the latest state or not by comparison with the group definition in the internal server 10 (which is appropriately updated based on the human-resource information in the company or others), and the group definition in the internal server 10 is automatically reflected to the group definition in the external server 20 so that the state is the latest state.

in the example illustrated in FIG. 3, note that the external server 20 has the user management I/F 23, and therefore, the group definition of the external ID in the external user management table 24 can be automatically updated by using the user management I/F. However, if the external server 20 does not have such an external interface but only an interface manually operated on the Web browser or others, the user who has the management authority may use this interface to manually update the group definition. Also, for example, the update can be also supported by such an interface as uploading and reflecting a CSV (Comma Separated Values) file or others configured of the update information of the group definition to the external server 20.

Also, in addition to the example illustrated in FIG. 3, for example, in the case as described above in which the user management I/F 23 is such an interface as directly accessing without the intermediation of the user so that the external user management table 24 can be maintained, such a method that the internal server 10 periodically accesses the external server 20 to update and maintain the group definition by previously storing the information such as the key or the password for the direct access in the internal server 10 can be also employed.

As explained above, according to the group definition management system 1 which is one embodiment of the present invention, the correspondence between the internal ID in the internal server (internal site) 10 such as the in-house system of the company and the external ID in the SNS service or others in the external server (external site) 20 can be easily acquired. Moreover, the information of the group definition based on the internal ID in the internal server 10 can be easily reflected to the information of the group definition forming the community or the group in the SNS service or others in the external server 20.

These manners can easily form the community or the group in which only the specific user of the internal server 10 such as the employee can participate as the member and the in-house communication of the company can be performed, in the SNS service or others on the external server 20 which cannot be basically controlled by the company or others. Also, after once the community or the group is formed in the external server (external site) 20, the communication can be performed by only the access to the external site (without the connection to the internal site) except for the maintenance of the group definition. Further, while it is cleared that the communication in this community is the in-house communication of the company performed off the job, it is secured that all the members are the employees, and therefore, the communication can be safely performed.

Moreover, the change in the group definition in the company in accordance with the resigning/retirement/layoff/firing and the personnel rotation in the company can be automatically reliably reflected to the group definition in the external server (external site) 20. Moreover, not only the group related to the human-resource information such as the department but also a group related to each belonging information of the employee, each project thereof, and each in-house activity theme of the company thereof can be easily automatically formed, and besides, the members can be limited to appropriate minimum members (free formation of the group or the community in the external site can be limited).

Moreover, the information of the external ID of the employee is systematically acquired regardless of the notification, application, etc. from the employee, and therefore, it can be reliably recognized whether or not the user in the external site (an owner of the external ID recognized on the internal site side) is (the employee) himself/herself. Moreover, such a usage method that not only the information of the external ID but also information related to an activity performance of the employee or others in the external server (external site) 20 is imported to and utilized on the internal server (internal site, in-house system of the company) 10 side can be also employed.

In the foregoing, the invention made by the inventor has been concretely described based on the embodiments. However, it is needless to say that the present invention is not limited to the foregoing embodiments and various modifications and alterations can be made within the scope of the present invention.

For example, in the present embodiment, as described above, the information of the group definition of the internal ID can be reflected to the group definition of the external ID by acquiring the information of the external ID on the external server 20 (for example, the external site such as Facebook) and corresponding the information to the internal ID in the internal server 10 (for example, the internal site such as the in-house system of the company). However, the relation between the servers (sites) to which the group definition is reflected is not limited to this.

As a modification example, for example, the user ID (external ID) or information specified based on the user ID can be acquired from not the external server 20 (for example, the external SNS site such as Facebook) but a different external site which operates in cooperation with the external server 20 as to the user information (for example, a social game site, etc. which operates in cooperation with the SNS service such as Facebook and which may be on the same external server 20 or on a different external server 20) as a source from which the information of the external ID is acquired. Moreover, in accordance with this, as a destination to which the information of the group definition of the internal ID is reflected, not the external server 20 (for example, the external SNS site such as Facebook) but the above-described different external site (for example, the social game site, etc.) can be employed.

For example, in a case in which the external server 20 (for example, the SNS service such as Facebook) does not have the user management I/F 23 which can automatically perform the processing for the information of the group definition, the above-described example can be applied when the external site (for example, the social game site, etc. developed/maintained by a company which maintains the internal server 10) which cooperates the user information with the external server can have the user management I/F 23, and besides, when the one who desires to manage the group definition is in the external site. In this case, while the user who accesses the external site (the social game site, etc.) uses user authentication based on the external server 20 (the SNS service such as Facebook), the group definition in the internal server 10 is reflected to the group definition in the external site.

Moreover, as another modification example, for example, by acquiring the information of the external ID in the external server 20 (for example, the SNS site such as Facebook) and the information of the group definition thereof by the internal server 10, the reflection can be performed based on the acquisition to the user registration and the group definition of a different external site (for example, a social game, etc. which operates in cooperation with the SNS service such as Facebook and which may be on the same external server 20 or on a different external server 20).

The present invention can be used in a group definition management system in which information of members in a user group is cooperated between an internal site such as an in-house system of a company and an external site such as an SNS service.

Although various embodiments of the present invention have been described and shown, the invention is not restricted thereto, but may also be embodied in other ways within the scope of the subject-matter defined in the following claims.

What is claimed is:

1. A group definition management system server connected to a network, comprising:
   a user management table that stores a first user login account ID being inputted from a user who can use the group definition management server and information related to a group definition of the user;
   an authentication unit that makes a first authentication of the user by the first user login account ID in response to a request from the user via a client device that is connectable to the group definition management server via the network; and
   an authentication cooperation unit that makes a second authentication of the user using a second user login account ID identifying the user through another server connected to the network to confirm that the user is authenticated in the another server based on the second user login account ID being inputted by the user in response to a request received from the client device used by the user who is authenticated by the authentication unit;
   wherein the authentication unit acquires the second user login account ID from the other server and registers the second user login account ID for the confirmed authenticated user of the other server in the user management table so as to correspond the second user login account ID for the user to the first user login account ID for the user.

2. The group definition management system according to claim 1, wherein, after the user who has authority to manage a group definition for the second user login account ID in the other server is authenticated by the authentication unit in response to a request from the client device used by the user, the group definition management server acquired information of a current group definition for the second user login account ID from the other server.

3. A group definition management method executed in a group definition management server connected to a network, comprising the steps of:
   a first step of storing in a user management table information of a first user login account ID for a user who can use the group definition management server and information related to a group definition of the user;
   a second step of making an initial authentication of the user by the first user login account ID in response to a request from the user via a client device connectable to the group definition management server via the network;
   a third step of making a second authentication of the user by acquiring a second user login account ID identifying the user through another server connected to the network to confirm that the user is an authentic user of the other server in response to a request from the client device used by the user who is authenticated in the second step; and
   a fourth step of registering the second user login account ID in the user management table for the authenticated user of the other server confirmed in the third step so as to correspond the second user login account ID for the user to the first user login account ID for the user.

4. A group definition management system, comprising:
   a client device connectable to a first server and a second server via a network;
   the client device rendering a graphical user interface for performing a second authentication of a user by a second user login account ID acquired from the second server to confirm that the user is authorized to manage a group definition for the second user login account ID in the second server, wherein the second user login account ID identifies the user;
   the client device rendering another graphical user interface for performing a first authentication of the user by a first user login account ID from the first server, wherein the first user login account ID corresponds to the second user login account ID authenticated by the second server;
   wherein, in response to authentication of the user by the first user login account ID from the first server, the client device renders a graphical user interface for requesting acquisition of information of the group definition for the second user login account ID from the second server; and
   the client rendering a graphical user interface related to a result of the first server's acquisition of information of the group definition for the second user login account ID from the second server.

* * * * *